United States Patent Office 3,756,948
Patented Sept. 4, 1973

3,756,948
METHOD AND MEANS FOR ABSORBING CRUDE OIL AND THE LIKE FOR TRANSPORTATION AND RECOVERY
Jerome Weinberg, San Diego, Calif., assignor to The Grantley Company, Jefferson, Ohio
No Drawing. Continuation-in-part of application Ser. No. 163,035, July 15, 1971. This application Mar. 23, 1972, Ser. No. 237,524
Int. Cl. B01d 15/00; E02b 15/04
U.S. Cl. 210—36            7 Claims

ABSTRACT OF THE DISCLOSURE

Crumbs of a particular polystyrene foam are disclosed for the absorption of hydrocarbon oils, one use being for the cleaning up of oil spills on a body of water, another being the cleaning up of a sandy beach polluted by crude oil, and another use being the absorption of crude oil at the well head so that the oil absorbed into the polystyrene may be transported using any ordinary means of transportation and without danger of liquid oil leakage or spillage along the line. Other uses are indicated.

---

This application is a continuation-in-part of my copending application Ser. No. 163,035, filed July 15, 1971.

Although the present invention is useful in the handling of different hydrocarbon oils, it has particular application in the case of crude oil spills on the high seas and on other bodies of water which are occurring with considerable frequency. The ability of the oil absorbent of this invention to separate hydrocarbon oils on water could also lend itself to other uses. For example, the discharge from ship's bilges and the flushing of tankers and barges might be treated by the use of this invention. The so-called blowing of bilges might be accomplished at dockside, using this invention for the removal of oil and permitting the discharge of acceptably clean water into waterways.

There has been a wide search for materials for use in oil removal in the case of spills on the high seas and these were rated by good authority about a year and a half ago as to weight of oil removed from the spill relative to the absorbent, as follows: Solid inorganics, 20 to 70 percent of the weight of the absorbent; porous inorganics, two to six times the weight of the absorbent; polymeric materials, five to ten times the weight of the absorbent; and natural organic materials (such as straw), five to forty times the weight of the absorbent depending upon conditions. The present invention utilizes a light and cheap material which absorbs about nineteen times its own weight of crude oil, which is effective within minutes where most of the other materials suggested take hours, which is easily picked up and clean to handle thereafter.

The material utilized in this invention is a foamed polystyrene plastic which is of closed cell-type, made by inflating cells of polystyrene with air. This results in a nonpermeable, multi-cellular mass that contains about 97 percent air by volume. It is only 1/42 as heavy as solid polystyrene and is 30 percent more buoyant than cork. The particular material utilized by this invention starts from an extruded foam which is produced by free expansion of a hot mixture of polystyrene, blowing agents and various additives through a slit orifice. This extrusion method allows variation of density and cell size so that foams can be tailor-made with specific properties. The particular foam used in this invention has a density between about 1.4 and about 2.0 pounds per cubic foot and an average cell size between about 1.0 mm. and 3.0 mm., and absorbs about nineteen times its weight of crude oil, has a selective absorption for oil when subjected to a mix of oil plus water, and does not soil upon contact after absorbing a saturated load of crude oil out of a bath of water. I intend by this description to designate only a product sold by Dow Chemical Company under the trademark Styrofoam, D.B. brand, and designated in the claims as "polystyrene" or "foamed polystyrene."

The absorbent foam of this invention is prepared by shredding such an extruded polystyrene board. The shredding is necessary to open up the cells for better oil absorption. The material when shredded might be called crumbs, the acceptable size of which for this invention passes through 3/4 inch mesh and is held on 1/4 mesh screen. The specific gravity of this shredded dry foam in the form of such crumbs is 0.093.

Before using this polystyrene crumb material in the present invention, unless it has already been fireproofed during manufacture, it is preferably treated to make it more fire retardant, such as by immersion of the foam material into a five percent boric acid-water solution and then allowed to dry.

In utilizing this invention in connection with an oil spill on the open seas or other bodies of water, the above described polystyrene crumbs are spread upon the oil layer, floating on water, by use of boats or airplanes. Preferably, the absorbent material is propelled in the nature of a jet stream into the oil layer from above which causes the same to penetrate the oil and to mix with it efficiently. The absorbent material of this invention becomes substantially saturated with about nineteen times its own weight in crude oil within a matter of one minute. Sometimes it is desirable to soak the absorbent material of this invention in water before injecting it into an oil spill at sea. This raises its specific gravity to about 0.854 which causes the absorbent material, when forcefully propelled against the oil spill layer, to enter more quickly and more deeply into the oil layer. The absorbent material of this invention has a selective absorption whereby it shows a preference for the oil rather than for the water. Thus, even when previously soaked in water before spreading the same upon an oil spill, it will be found that this absorbent material is saturated with oil and rejects the water when spread upon a spill.

In recovering the oil saturated polystyrene crumbs of this invention after absorption of oil from an oil spill, the crumbs of polystyrene are easily handled and do not deposit oil on the materials or equipment used to pick up and transport such absorbent material.

It may be desirable to aid in the agglomeration of the oil-saturated polystyrene crumbs of this invention so as to pick up the same more efficiently. To this end, a polyvinylchloride solution may be spread upon the floating layer of saturated polystyrene crumbs, as by spraying. Such a solution may be prepared by adding to the polyvinyl chloride a straight chain ketone solvent, such as methylethylketone, which solvent is of such a character that it evaporates quickly into the air after leaving the spray gun. Another suitable agglomerate for this purpose is a low solids polyvinyl chloride solution which is a byproduct from the cleaning of polyvinyl chloride reactors. It contains about five percent solids and about 95 percent of a "Re-solv" product which is disclosed and claimed in the copending patent application entitled "Method and Solution for Dissolving Polyvinyl Chloride Resin," Ser. No. 31,409, filed Apr. 23, 1970, by Theodore Carosello and Jerome Weinberg. This "Re-solv" is a non-pollutant.

A solvent slow to evaporate cannot be utilized for this agglomeration operation because such a solvent would attack the polystyrene. The above named agglomeration solution solidifies within a matter of a mintue or two, after which the saturated polystyrene crumbs may be picked up in chunks to recover the same from the water upon which it floats.

Another use of this invention might be in the absorption of crude oil directly at the well head so that the same could be transported by any ordinary bulk container means and so transported safely and conveniently to a point of use. In this application, the polystyrene absorbent crumb material, as hereinabove described, would merely have to be mixed for a minute or two in a batch or continuous mixer with the crude oil, absorbing about nineteen times the weight of the absorbent material in crude oil, after which the saturated crumbs of polystyrene could be transported as if it were only discrete materials of any easily handled character. The absorbed oil will not leak out of the saturated polystyrene crumbs and will not dirty the transportation vehicle or bulk machinery handling apparatus used in connection with the same.

Other uses would be in a ship's bilges to absorb any oil, or in any tank to absorb oil before making repairs.

Still another use of the material of this invention would be as a filter material to pick up hydrocarbon oils out of a mixture of such oils with water and the like. The discharge from the ship bilges and from the flushing of tankers and barges could be handled in this manner so that the discharged water would be clean enough to cause no pollution problem and the filter material, after saturation with the oil, could be transported to a point of recovery and re-use. Another use for such a filter of this material might be in the treatment of cutting oil or emulsified oil which could be separated from water so as to reduce pollution from the discharge.

Several methods are useful in recovering the oil from the saturated polystyrene crumbs. The saturated crumbs may be treated with a solvent which will dissolve the polystyrene material. A preferred solvent for this purpose is methylethylketone, although one may use methylisobutylketone, acetone, benzene, toluene, xylene, carbon tetrachloride, perchlorethylene or tri-chlorethylene. Because of the multi-cellular character of the polystyrene crumbs, such a solvent acts within a minute or two to completely dissolve the cellular polystyrene material, releasing the absorbed oil with the result that one would have two layers of different specific gravity, the layer of lesser volume being the solvent, plus dissolved polystyrene, and the layer of greater volume being crude oil. These two layers may then be separated by decantation. Another method of separation of the mixture of solvent, dissolved polystyrene and crude oil is by distillation, in which case the solvent would be driven off first, then the water, if any, and then the various fractions of the distillation from the crude oil as is common practice. The polystyrene material would then remain in the still as foots.

The polystyrene crumbs of this invention, saturated with crude oil or the like, can be heated to a temperature which causes the polystyrene to melt, thereby recovering the crude oil separated therefrom.

In some cases, oil spills reach sandy beaches to pollute the same. To clear up such a beach, the oil contaminated sand may be mixed with the polystyrene crumb material of this invention and then, upon contact with water, the oil remains in the polystyrene crumbs and the clean sand may be recovered.

The polystyrene material of this invention when precoated with a fire retardant as above described, either before or after absorbing hydrocarbon oils as described hereinabove, could not be ignited even by applying a propane blow torch of 3500 degrees Fahrenheit temperature to the surface of the absorbent material. Obviously, if the absorbed oil gives off flammable fumes, such fumes could ignite.

Wild life present in the midst of an oil spill treated by the method set forth in this invention would not be subjected to being covered by a sticky coating of spilled crude oil.

High or low ambient temperatures have no effect upon the absorption of oil according to this invention or for dissolving the same in methylethylketone or the like.

The time involved in either the absorption of hydrocarbon oils or the dissolving of the polystyrene crumbs after saturation with hydrocarbon oils occurs in a matter of a minute or two whereas other absorption methods usually require hours.

No great agitation is necessary to cause either the absorption of hydrocarbon oils or the dissolving thereof according to the teachings of this invention.

While this invention has been described chiefly in connection with crude oil, which has been involved in many spills on the high seas, it has also proved effective in handling diesel oil, gasoline, fuel oil, kerosene, emulsified oil, refined oil with additives, motor oil, cutting oil, and other hydrocarbon oils.

It should be borne in mind that the absorbent material described for use in this invention is low in price, readily available, and one ton of such absorbent material can pick up almost nineteen tons of crude oil.

What is claimed is:

1. A method of picking up a spill on water of a liquid hydrocarbon oil, comprising absorbing the oil in crumbs of foamed polystyrene of normally closed cell-type of which the cells have been opened up by shredding, a multi-cellular mass of such polystyrene having a density between 1.4 and 2.00 pounds per cubic foot, having an average cell size between 1.0 mm., and 3.0 mm., having a selective absorption for oil when subjected to a mix of oil plus water, which does not soil upon contact after absorbing a saturated load of crude oil out of a bath of water, which absorbs about nineteen times its weight of crude oil and said crumbs of a size passing three-quarters inch mesh and retained on a one-quarter inch mesh screen.

2. A method as defined in claim 1, including as a first additional step the treating of said oil-saturated polystyrene crumbs with a solvent adapted to dissolve said crumb material.

3. A method as defined in claim 2, wherein said solvent is chosen from the group consisting of methylethylketone, methylisobutylketone, acetone, benzene, toluene, xylene, carbon tetrachloride, perchlorethylene and tri-chlorethylene.

4. A method as defined in claim 1, wherein said hydrocarbon oil floats as a layer on water, including the step of forcing a stream-like jet of said polystyrene crumbs into said oil layer to mix said crumbs and oil.

5. A method as defined in claim 4, including the preliminary step of substantially saturating said polystyrene crumbs in water before the step of forcing said crumbs into said oil layer, whereby to increase the penetration of said crumbs into said oil layer.

6. A method as defined in claim 1, including the step of coating said polystyrene crumbs with a thin coating of a fire retardant before the step of absorbing said hydrocarbon oil into said crumbs.

7. A method as defined in claim 1, wherein said hydrocarbon oil is originally found mixed with sand, said crumbs of polystyrene are then mixed with said oily sand, and said mixture is then treated with water to remove substantially oil-free sand from said crumbs into which said oil is absorbed.

(References on following page)

References Cited

UNITED STATES PATENTS

| | | | |
|---|---|---|---|
| 3,494,862 | 2/1970 | Horowitz | 210—40 |
| 2,367,384 | 1/1945 | Tymstra et al. | 210—36 |
| 3,617,564 | 11/1971 | Hooven et al. | 210 Dig. 21 |

FOREIGN PATENTS

| | | | |
|---|---|---|---|
| 1,804,419 | 5/1970 | Germany | 210—Dig. 21 |
| 979,978 | 1/1965 | Great Britain | 210—Dig. 21 |

OTHER REFERENCES

"Oil Spill Treating Agent," Battelle Northwest, Richland, Wash., May 1, 1970, p. 194.

SAMIH N. ZAHARNA, Primary Examiner

R. W. BURKS, Assistant Examiner

U.S. Cl. X.R.

210—40, Dig. 21